United States Patent
Tsai

[11] Patent Number: 6,027,251
[45] Date of Patent: Feb. 22, 2000

[54] BRACING STRUCTURE OF ROTARY ROD

[76] Inventor: Lore Tsai, No. 23, Alley 2, Lane 248, Sec. 2, Li-Min Rd., Nan Tun Area, Taichung, Taiwan

[21] Appl. No.: 09/115,670

[22] Filed: Jul. 14, 1998

[51] Int. Cl.⁷ .............................. F16C 31/00; A63F 7/36
[52] U.S. Cl. ................... 384/126; 273/108.52; 384/490; 384/537
[58] Field of Search .................................. 384/126, 490, 384/537; 273/108.52

[56] References Cited

U.S. PATENT DOCUMENTS

| | | | |
|---|---|---|---|
| 2,308,472 | 1/1943 | Smith, II | 384/537 X |
| 2,872,254 | 2/1959 | McNaughton et al. | 384/126 |
| 4,382,598 | 5/1983 | McCloud | 384/285 X |
| 5,072,880 | 12/1991 | McCloud | 384/273 X |

*Primary Examiner*—Thomas R. Hannon
*Attorney, Agent, or Firm*—Browdy and Neimark

[57] ABSTRACT

A rotary rod bracing structure is composed of a main body and a circular inner pad, which is received in a recess of the main body. The bottom of the recess has a round hole. The circular inner pad is provided with a circular groove and an axial hole. The inner pad is received in the recess such that axial hole and the round hole are corresponding in location to receive the rotary rod. A plurality of balls is disposed in the circular groove such that the lubricating member is in contact with the inner wall of the recess for reducing the friction between the recess and the inner pad. The rotary rod is braced by the inner pad.

7 Claims, 5 Drawing Sheets

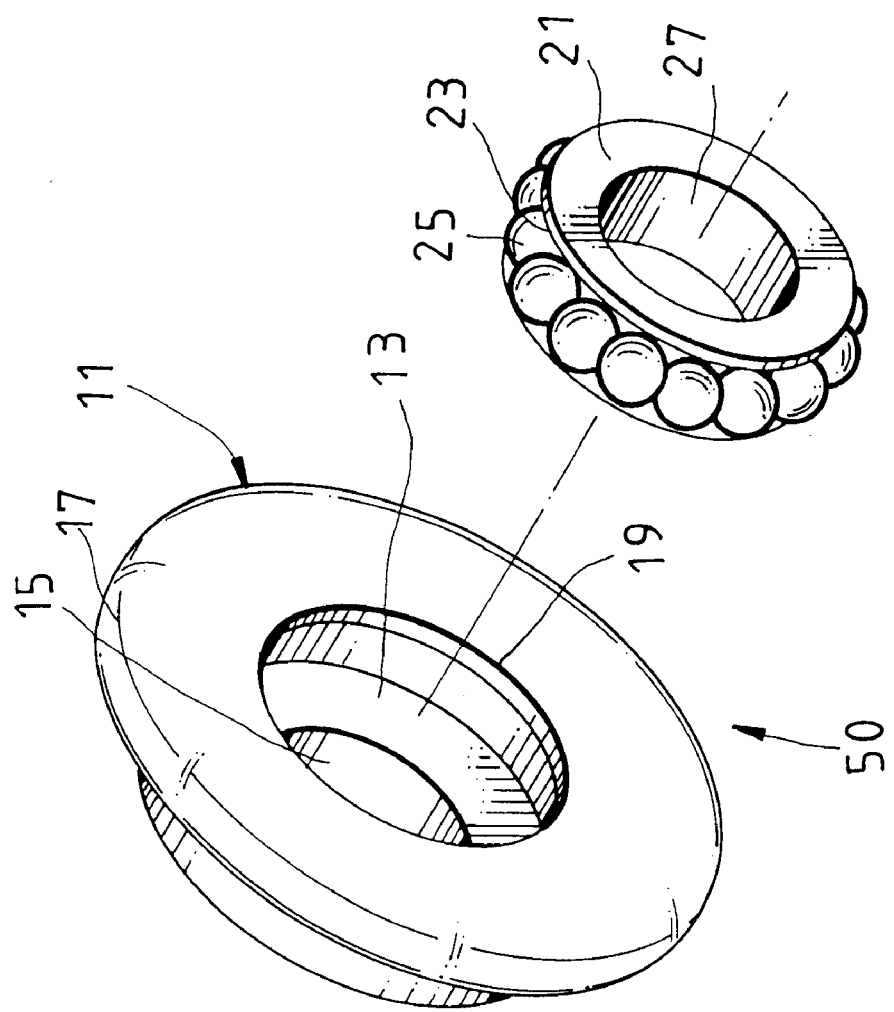

സ6,027,251

BRACING STRUCTURE OF ROTARY ROD

FIELD OF THE INVENTION

The present invention relates generally to a bracing structure that is incorporated into a receiving hole of the plate for keeping firmly a rotary rod in place, and more particularly to a bracing structure which is reduced in volume and the number of component parts of which the bracing structure is made up.

BACKGROUND OF THE INVENTION

As shown in FIG. 1, a bracing structure 1 of the prior art is used in the football game table for fastening firmly a rotary rod 4 which is put through a through hole of the game table wall in conjunction with two receiving members 2 each having an insertion tube 3 which is inserted into the through hole. Such a prior art bracing structure 1 as described above is defective in design in that the rotary rod 4 can not be turned smoothly in light of the excessive mechanical friction between the rotary rod 4 and the wall of the insertion tube 3.

As shown in FIG. 2, another bracing structure 6 of the prior art is intended to overcome the friction drawback of the bracing structure 1 of the prior art described above. The bracing structure 6 is designed to fasten firmly a rotary rod 9 in place such that the rotary rod 9 is put through two receiving members 7 and a bearing 8 disposed between the two receiving members 7, and that the rotary rod 9 revolves in the bearing 8 in a way that the friction is substantially reduced at the time when the rotary rod 9 is in operation. The bracing structure 6 is defective in design in that it is complicated in construction, and that it is not cost-effective, and further that it is relatively large in volume.

SUMMARY OF THE INVENTION

The primary objective of the present invention is therefore to provide a rotary rod bracing structure which is relatively simple in construction, cost-effective, and small in size.

In keeping with the principle of the present invention, the foregoing objective of the present invention is attained by a rotary rod bracing structure consisting of a main body and an inner pad. The main body is provided with a recess which is provided in the bottom thereof with a round hole. The inner pad is provided in the periphery thereof with a circular groove. The inner pad is received in the recess such that the axial hole of the inner pad is corresponding in location to the round hole of the recess of the main body. A lubricating (i.e. bearing) member (e.g. rolling elements) is disposed in the circular groove such that the lubricating member is in contact with the inner wall of the recess for reducing the friction. The rotary rod is received in the axial hole and the round hole in such a manner that the rotary rod is braced by the inner pad.

The foregoing objective, features, functions, and advantages of the present invention will be more readily understood upon a thoughtful deliberation of the following detailed description of the present invention with reference to the accompanying drawings.

BRIEF DESCRIPTION OF THE DRAWINGS

FIG. 6 shows a schematic view of a protruded edge located at the open end of the recess of another preferred embodiment of the present invention.

DETAILED DESCRIPTION OF THE INVENTION

Figure 1:
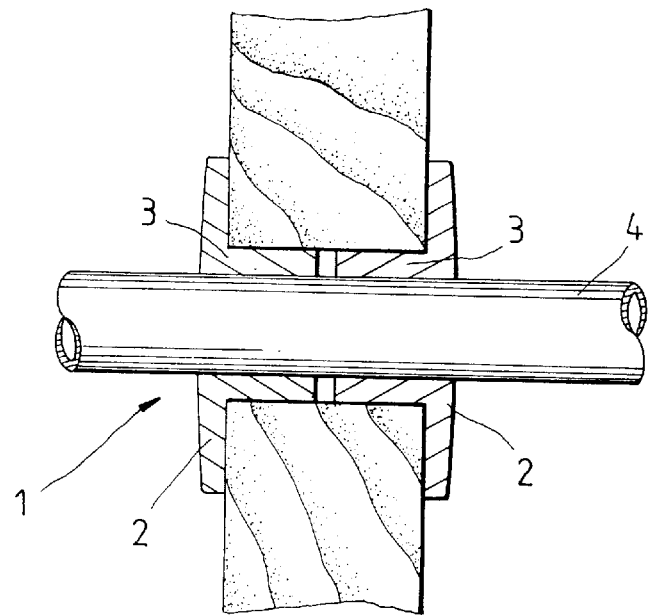
FIG. 1 shows a sectional view of a rotary rod bracing structure of the prior art.
Figure 2:
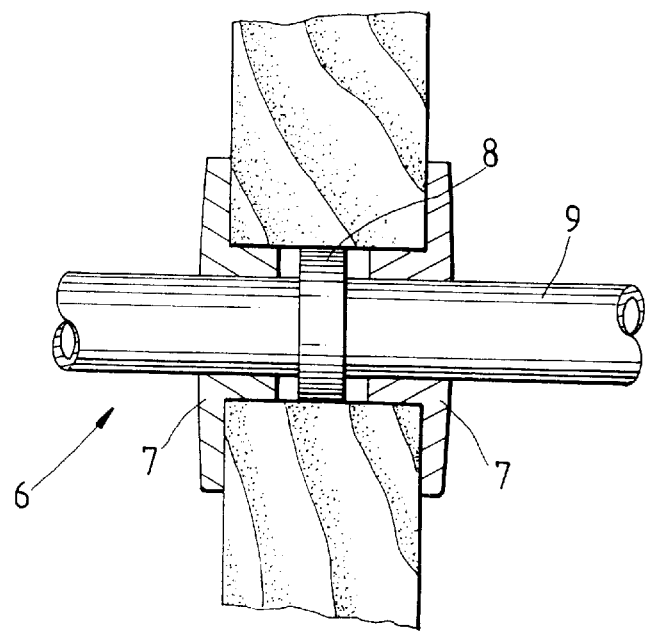
FIG. 2 shows a sectional view of another rotary rod bracing structure of the prior art.
Figure 3:
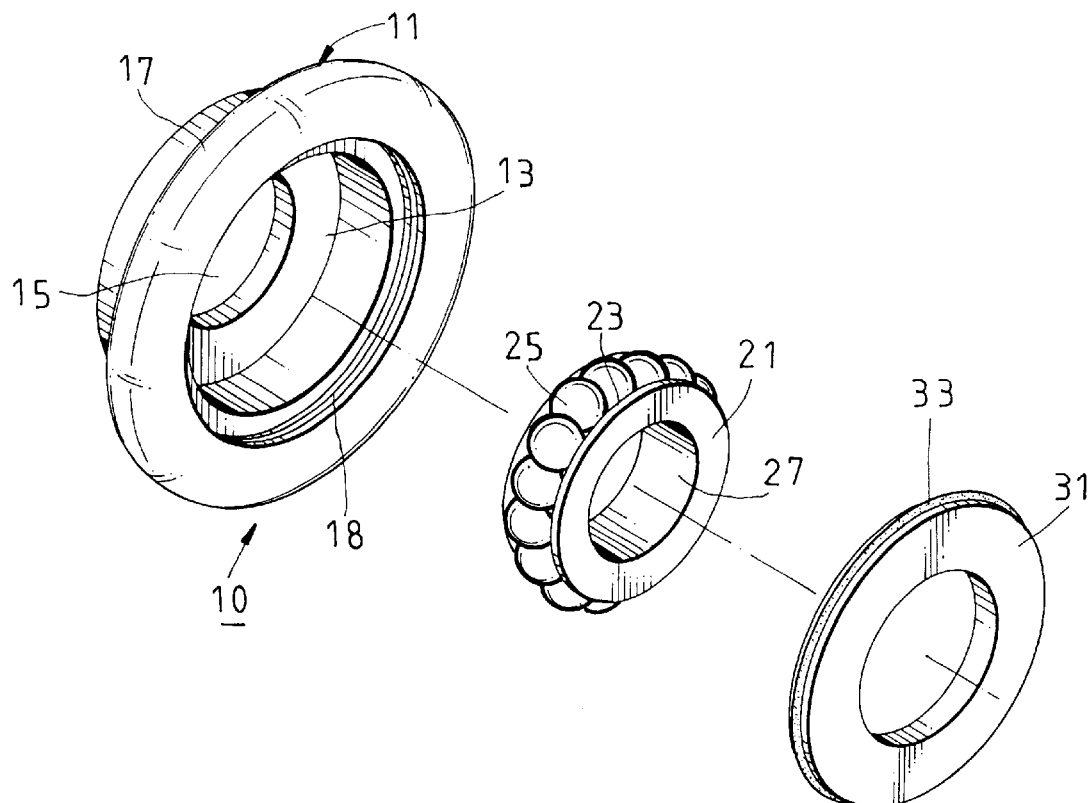
FIG. 3 shows an exploded view of a preferred embodiment of the present invention.
Figure 4:
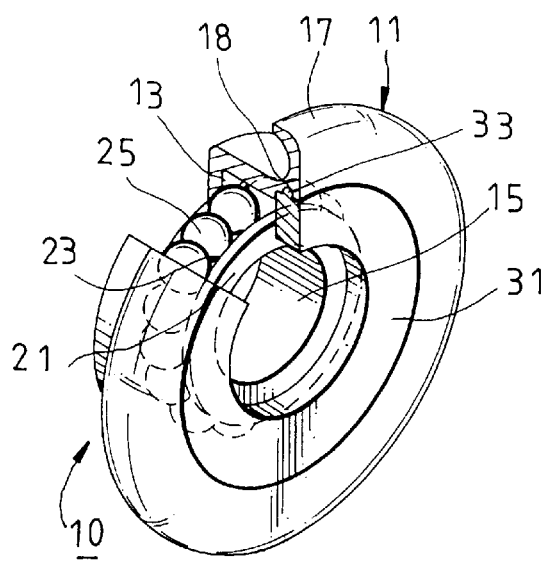
FIG. 4 shows a partial sectional view of the preferred embodiment of the present invention in combination.
Figure 5:
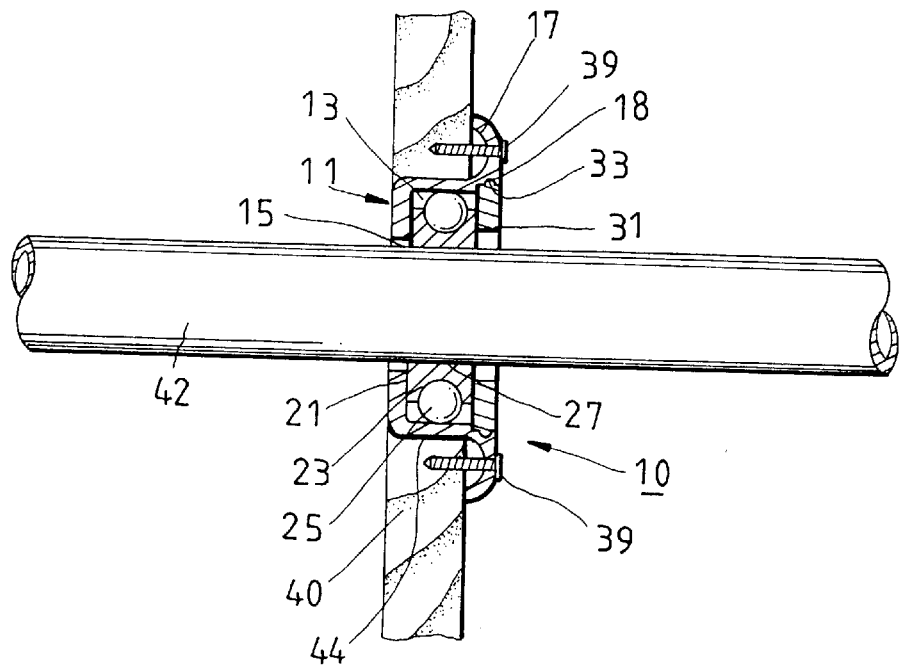
FIG. 5 shows a sectional schematic view of the preferred embodiment of the present invention in combination and in the state of the embodiment.

As shown in FIGS. 3–5, a rotary rod bracing structure 10 of the present invention is mainly composed of a main body 11 and a circular inner pad 21.

The main body 11 is provided at one end thereof with a round recess 13 which is in turn provided in the bottom thereof with a round hole 15. The main body 11 is further provided in the outer periphery thereof with a shoulder 17 having an arcuate cross section.

The circular inner pad 21 of a plastic material is provided in the outer periphery thereof with a circular groove 23 in which a plurality of balls (lubricating members) 23 are disposed. The circular inner pad 21 is disposed in the recess 13 such that the balls 23 are in contact with the inner walls of the circular groove 23 and the recess 13, so as to enable the circular inner pad 21 to turn smoothly in the recess 13. The circular inner pad 21 has an axial hole 27 corresponding in location to the round hole 15. A rotary rod 42 is received in the axial hole 27 and the round hole 15.

The recess 13 has an open end which is covered with a cover plate 31 for confining the circular inner pad 21 in the recess 13. The inner side of the open end of the recess 13 is provided with a slot 18. The cover plate 31 is provided in the periphery thereof with a protruded strip 33, which is received in the slot 18.

As illustrated in FIG. 5, the bracing member 10 is disposed in a hole 44 of the football game table such that the shoulder 17 is rested against the circumferential edge of the hole 44. The bracing member 10 is fastened with the wall 40 of the football game table. The shoulder 17 is deformed elastically to join the table wall 40. The rotary rod 42 is received in the axial hole 27 such that both ends of the rotary rod 42 are respectively engaged with a handle (not shown in the drawing) and a protective shield (not shown).

When the rotary rod 42 is rotated, the circular inner pad 21 is actuated to turn, thereby causing the balls 25 to locate between the peripheral edge and the inner wall of the recess 13. As a result, the rotary rod 42 is well supported while turning. The bracing structure 10 of the present invention is simple in construction and can be installed in a relatively small space.

A bracing structure 50 of another preferred embodiment of the present invention is shown in FIG. 6 and is different from the previous embodiment in that the former comprises a recess 13 which is provided at the open end thereof with a protruded edge 19 for confining the circular inner pad 21 such that the circular inner pad 21 is prevented from falling out of the recess 13, without the use of the cover plate 31.

Figure 7:
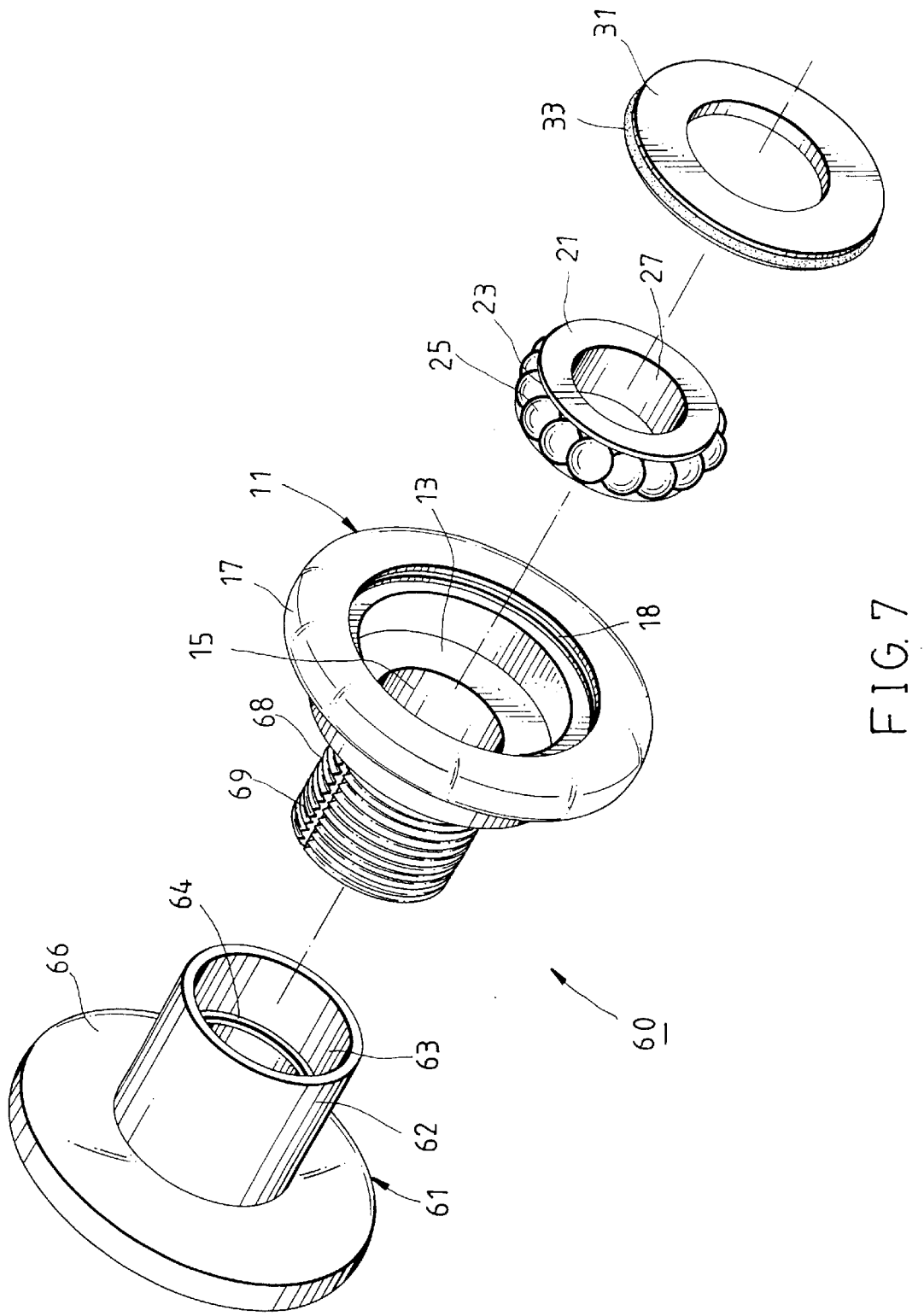
FIG. 7 shows an exploded view of still another preferred embodiment of the present invention.

As shown in FIG. 7, a bracing structure 60 of the present invention consists of a main body 11 having a round hole 15 with a columnar portion 68 extending axially and having a plurality of retaining rings 69 of a ratchetlike cross section. A female retaining member 61 is composed of a columnar portion 62 which is provided at one end thereof with a disk 66 and a fitting hole 63 extending axially. The fitting hole 63 is provided therein with a retaining ring 64 of a ratchetlike cross section.

Figure 8:
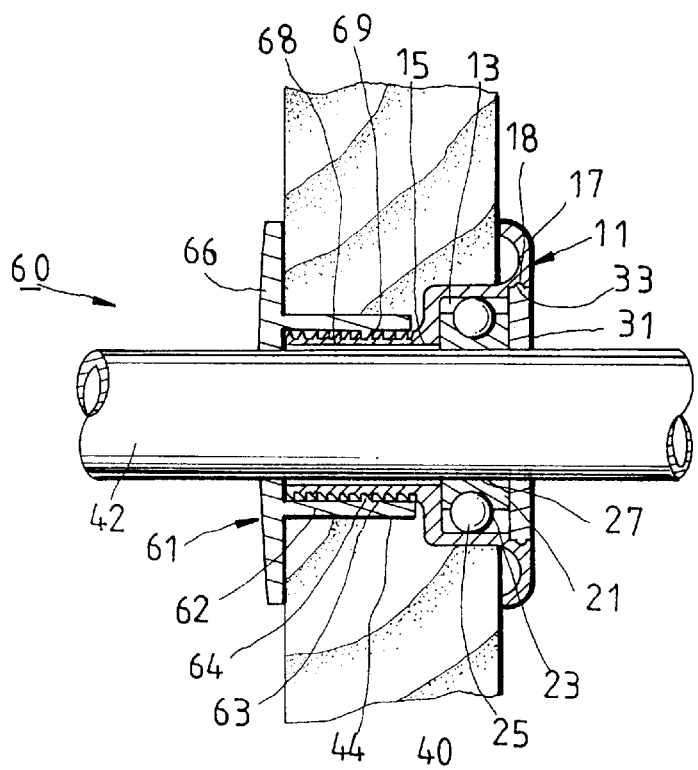
FIG. 8 shows a sectional view of still another preferred embodiment of the present invention.

As shown in FIG. 8, the columnar portion 62 of the female retaining member 61 is received in the hole 44, whereas the columnar portion 68 of the main body 11 is received in the fitting hole 63 of the female retaining member 61. The retaining ring 64 is stopped by the retaining rings 69 such that the present invention is secured to the table wall 40, without the use of screws.

The present invention may be employed in the situations other than the football game table referred to above.

What is claimed is:

1. A rotary rod bracing structure comprising:

a main body having a recess with an open end, said recess provided in a bottom wall thereof with a round hole; and a circular inner pad provided in a periphery thereof with a circular groove, and an axial hole, said inner pad being disposed in said recess such that said axial hole of said inner pad is corresponding in location to said round hole of said main body, and that a bearing member is disposed in said circular groove in a way that said bearing member is in contact with an inner wall of said recess for reducing friction between said recess and said inner pad bracing a rotary rod which is received in said round hole of said main body and said axial hole of said inner pad.

2. The rotary rod bracing structure as defined in claim 1, wherein said open end of said recess of said main body is provided with a cover plate fastened therewith.

3. The rotary rod bracing structure as defined in claim 2, wherein said recess is provided in an outer edge of a periphery thereof with a slot; wherein said cover plate is provided in an outer peripheral edge thereof with a protruded strip; and wherein said cover plate is fastened with said open end of said recess such that said protruded strip is retained in said slot.

4. The rotary rod bracing structure as defined in claim 1, wherein said open end of said main body is provided with a protruded edge; and wherein said inner pad is received in said recess such that said inner pad is stopped by said protruded edge.

5. The rotary rod bracing structure as defined in claim 1, wherein said bearing member comprises a plurality of balls.

6. The rotary rod bracing structure as defined in claim 1, wherein said main body is provided in a periphery thereof with a shoulder.

7. The rotary rod bracing structure as defined in claim 1, wherein said main body is provided with a columnar portion extending along the direction of a longitudinal axis of said round hole of said recess, said columnar portion provided in an outer periphery thereof with a plurality of retaining rings of a ratchetlike cross section, said main body further comprising a female retaining member having a columnar portion which is provided at one end thereof with a disk, said columnar portion provided axially with a fitting hole which is provided therein with a retaining ring of a ratchetlike cross section, said columnar portion of said female retaining member being joined with said columnar portion of said main body such that said retaining ring of said female retaining member is retained by retaining rings of said main body.

* * * * *